United States Patent

Hollingsworth

[15] 3,662,403

[45] May 9, 1972

[54] MAGNETIC, AND MAGNETIC REMOVAL RECORDING

[72] Inventor: R. Lee Hollingsworth, 110 Fox Boulevard, Massapequa, N.Y. 11758

[22] Filed: Nov. 14, 1966

[21] Appl. No.: 594,269

Related U.S. Application Data

[63] Continuation of Ser. No. 145,805, Oct. 18, 1961.

[52] U.S. Cl. ....................346/74 M

[51] Int. Cl. ....................G11b 5/02, G01d 15/12

[58] Field of Search ....................117/8; 179/100.2 CF

[56] References Cited

UNITED STATES PATENTS

| | | | |
|---|---|---|---|
| 2,053,494 | 9/1936 | Pirie et al | 91/9 |
| 2,254,531 | 9/1941 | Kirchner | 91/18 |
| 3,246,219 | 4/1966 | Devol et al | 179/100.2 |
| 3,307,163 | 2/1967 | Rabinow | 179/100.2 |
| 2,985,863 | 5/1961 | Buslik | 179/100.2 |

FOREIGN PATENTS OR APPLICATIONS

| | | | |
|---|---|---|---|
| 822,240 | 10/1959 | Great Britain | 179/100.2 |
| 832,580 | 4/1960 | Great Britain | 179/100.2 |

*Primary Examiner*—Bernard Konick
*Assistant Examiner*—Vincent P. Canney

[57] ABSTRACT

The present invention is characterized as means to scan remove magnetic particles from a magnetic coated tape; from tape having a magnetic printed basic pattern thereon such as equidistant longitudinal lines; from tape having a magnetically printed halftone continuous pattern thereon, such magnetic removal accomplished by passing the tape through the pole faces of a magnetic recording head, or passing the tape in operative relation to a magnetic transducer means. At least one of the poles of the recording head is brought to a point substantially as sharp as a needle point. Relatively large power is required to produce satisfactory elemental of the magnetic particles according to modulated wave energy applied to the recording or transducer head. The invention can produce permanent magnetic recordings by the absence of the particles removed; printing stencils and printing plates; projectable pictures, data information, projectable news and pictorial presentations including advertising, and instantaneous substitute for microfilm records. There are other applications since the packing density measurements indicate that such pictures may have 18,000,000 bits per square inch of elemental detail, and perhaps considerably more.

1 Claims, 11 Drawing Figures

R. Lee Hollingsworth
INVENTOR.

R. Lee Hollingsworth
INVENTOR.

MAGNETIC, AND MAGNETIC REMOVAL RECORDING

This application is a continuation of Ser. No. 145,805 filed Oct. 18, 1961 and now abandoned.

The present invention pertains to magnetic recording, including recording by magnetic removal of magnetizable particles from a carrier such as a coated tape, drum or the like, with readout comprising magnetic transducer and/or light transducer means.

When the magnetic material is removed from transparent tape or a carrier, two recordings are made, one recording being magnetically sensitive to transducer means by absence of the magnetic material, and one recording sensitive to light passed through, or reflected from the carrier, into a light transducer means. This feature of the invention is utilized in reducing errors, and monitoring for errors in computers and other data recording devices.

In making the tape for the present invention, the magnetic material may be printed in extremely fine dots so they each may be magnetically removed singly, or in groups according to the instant magnetic impulse value as to time occurrence, and the amount of pressure by the magnetic stylus or blade-like recording drum spiral means. It is preferred however, that the material be lifted from the exact spot where the instant magnetic lifting and pushing forces are applied, and this may mean the lifting of one or a few of the fine magnetic printed dots, or of a very fine particle of one dot, or, where the coating is continuous on the tape. In making the tape, a magnetic coating for example a black one, may be made with an attaching binder to permit the magnetic particles to be removed rather easily, than the removal of the coating on regular magnetic recording tape such as Scotch Brand recording tape, as example. The tape, or paper, may be black and the magnetic binder solution colored white, to give the effect of black print on white paper.

In my pending U.S. Pat. application No. 820,990 now U.S. Pat. No. 3,160,704, filed June 17, 1959, I describe ways and means of printing magnetic lines across the tape, that scan via a transversely angled transducer with longitudinal tape movement, past a gap of said transducer across the tape at a defined angle to magnetically bridge from the end of one line to the other end of the next line. For use in the present invention, the lines may run lengthwise, while the pointed magnetic stylus or scanner moves transversely of the tape to lift particles of the magnetic material from the printed lines, or to magnetically record impulses within each line of magnetic material.

To cover all requirements in recording using the magnetic removal method of recording according to the present invention, selecting the elemental size of the magnetic particles is a consideration. For example, a magnetic powder in a binder solution placed on a carrier such as a tape or page sheet, for lower speed facsimile printing and recording, or duplicating work, and tape letter or type-like magnetic printing on tape or page, the size of the magnetic particles in the binder may be many times the size of the powder or particles used in making television and high packing density magnetic removal recording tape, according to the present invention.

In the present invention, it was noted that with a slight increase in pressure of a magnetic recording stylus upon the tape, a larger area of the magnetic material was lifted off of the tape by the concentrated instantly applied magnetic force.

One purpose of the invention is to remove magnetic printed elemental units from a tape carrier in accordance with concentrated electromagnetic field pulsations, or by magnetic physical application to the tape.

Another purpose is to remove elemental parts of a magnetic coating, from a magnetically printed or coated carrier medium such as a plastic tape or sheet, or a paper tape or sheet, wherein the binder is purposefully made sufficiently weak in strength, to enable the particles to be more readily magnetically lifted individually and removed without taking additional or excessive microscopic chunks of the binder and magnetic material held together by the binder material.

Another purpose of the invention is to magnetically or electromagnetically scan a sharp pointed flexible magnet transversely of a tape according to applied scanning wave energy, and wherein electromagnetic writing pulsations are applied perpendicular to the transverse scanning and these intelligence bearing magnetic pulsations are applied to said flexible magnet to lift the magnetic particles from the tape, or to magnetically record on the tape.

Another purpose of the invention is to provide a means for magnetic removal from a magnetically coated tape, or sheet by highly concentrated magnetic field energy, in accordance with magnetic undulations.

Another purpose is to provide rotated spiral means forming a high speed, high packing density transverse magnetic removal recording system.

Another purpose of the present invention is to provide a tape recording that can be instantly light monitored or light projected; be light scanned and/or magnetically scanned, to provide a permanent recording capable of use in a multiplicity of readout means.

One method or magnetic scanning used in my pending U.S. Pat. application Ser. No. 36,678, Filed June 16, 1960 is utilized in the present invention but with improvements to selectively apply pressure to the recording tape during each transverse of the tape recording line. Another purpose is to apply the principle of opposed concentrated magnetic fields to produce magnetic removal recording.

In magnetic removal recording, the recording impulses may be applied to the tape in accordance with television color scansion energy.

After the conception of the present invention, interesting experiments were conducted that prooved, that the harder and more brittle the binder and iron oxide coating on the tape, the more erratic was the lifting of each microscopic size element of the binder and its content, in that particles lifted, although positive in effect, had jaggered edges when viewed by a microscope, when the lifting was from standard Scotch Brand magnetic recording tape, using a rather sharp point. When the point of the stylus was rounded, more unexpected results took place. The magnetic lifting power, applied at a determined value, broke and wrinkled the coating, but did not totally lift and remove the small chunks of magnetic material from the tape. While such a recording could be fixed in the wrinkled condition to provide a good type of magnetic recording, however the packing density and quality of recording would not be comparable to the use of a much sharper point where the material is either recorded in the usual manner or completely removed in smaller particle sizes, however, stronger signal energies from the tape of such a wrinkled and fixed magnetic tape could be expected, due to both physical re-arrangement and magnetization of the wrinkled particles.

The following description of the present invention is by way of example, and many ways, means and methods of removing the magnetic coating from a tape or sheet, by partial magnetic lifting or removal as scanned, may be used, including a rotating spiraled magnetic pole piece in the form of sharp edged spirals placed on and partially around a drum means, which engages said tape with an opposite magnetic pole of the recording magnet, placing the tape in a recording gap which is transversely scanned by the sharp edged spirals on the drum means.

It is to be understood, that the methods of recording herein illustrated, described or exemplified, may be used for conventional magnetic recording by reducing the applied recording intelligence bearing power to the point, where the physical position of the magnetic coating remains undisturbed, but is magnetized according to the applied magnetic undulations. Transducers having very sharp blade edges as pole piece ends, and sharp pointed pole piece ends distinguish the present invention from the prior art, particularly when the transducer is scanned upon the tape, or the tape upon the poles.

A preleminary description of the invention is as follows, and reference is made to the drawings wherein, FIG. 1 is an end elevational view of the usual construction of magnetic recording tape;

Figure 1:
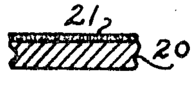

In describing the present invention in detail, reference is first made to FIG. 1, wherein 20 is a plastic tape or carrier having a coating of magnetic material 21 according to the prior art, except in the present invention, the coating binder containing the magnetic particles is very much weaker, and it does not bind the particles together and to the tape as strongly as recording tape made now by the trade for sound and video recording, and for computer use, although the tape coating of the present invention is strong enough to withstand reasonable use and wear. The preferred method of recording according to the present invention is to effect magnetic particle removal in registering the magnetic impulses, and to utilize the inherent light sensitive feature after removal, looking though, or reflected from, the base of the tape exposed by the removal. In computer and impulse keying recording work, this provides a magnetic recording reversed as to light sensitive keying, in the terms of the telegraphic art. When translators sensitive to both magnetic absence and light sensitivity in the areas of magnetic absence, a dual readout means is provided for various uses to indicate errors and to actuate alarm means, or record the resulting alarm signal on the tape in another position to indicate errors having occurred in the transmission or of the recording. This feature is also available for use in machines that utilize tape that is magnetically coated and the code characters be punched all the way through the tape. The two voltages, from the magnetic recording, and of the light readout, may be added together to greatly increase the recording voltage during readout, one voltage to be used for mark and reading, and the other voltage utilized for space lockout against noise during the time of the space voltage occurrence. The circuits for the accomplishment of this effect are well known in the telegraphic arts and sciences.

Figure 2:
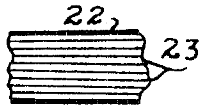
FIG. 2 is a plan view of a clear plastic tape with closely placed longitudinal magnetic material lines thereon.

FIG. 2 shows a length of tape whereby 22 indicates the clear tape and 23 indicates the fine lines of magnetic material which makes it easier for a magnetic stylus to lift small sections from the tape according to magnetic pulsation power and mechanical pressure under the point of the stylus on the opposite sides of the tape.

Figure 3:
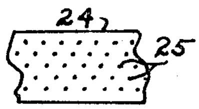
FIG. 3 is an enlarged plan view of printed dots on clear plastic tape which are, in practice about 1,000,000 or more per square inch.

FIG. 3 shows a length of clear tape 24 having printed thereon magnetic particle units 25. These units are preferably placed in half tone fashion and are as small as can be printed, namely about 1,000 per inch or as close together as possible. Here, the magnetic pointed stylus removes a part of one magnetic unit during the shortest possible impulse. If the impulse be for a greater duration and is stronger, more of the printed dot or dots are removed according to the duration of the impulse, the strength of the impulse and of the mechanical pressure applied to the tape; the pressure being applied during a full transverse line of recording, and the pressure means not being sensitive to each individual impulse. The pressure is not at all necessary for satisfactory recording, however it was found to be advantageous to a degree.

Figure 4:
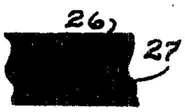
FIG. 4 is a plan view of a tape with a solid magnetic coating.

FIG. 4 shows a length of clear tape 26, which has been coated with black easily removable by concentrated magnetic force magnetic coating 27.

Any of the tapes described or used, according to the present invention the printing of synchronizing characters along the tape to drive the tape regeneratively and degeneratively in synchronous control as to speed, and synchronously operate other portions of the recording and readout translating mechanism, as shown herein, and in my pending patent application Ser. No. 820,990 filed June 17, 1959 now Pat. No. 3,160,704, and my continuation in part application Ser. No. 396,842 is herein anticipated.

Figure 5:
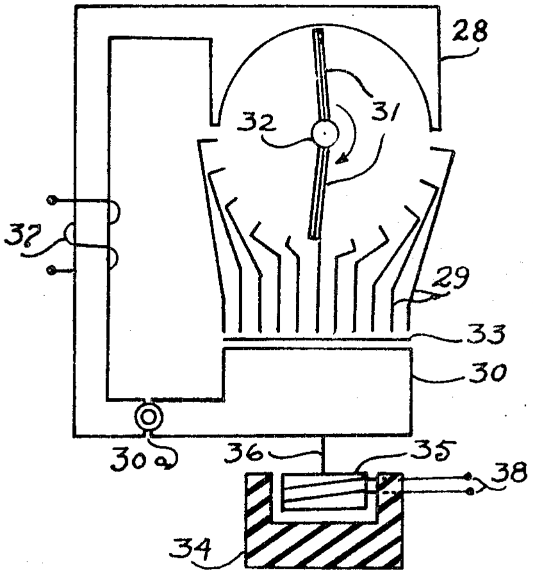
FIG. 5 is a plan view of a preferred embodiment of the present invention.
Figure 6:
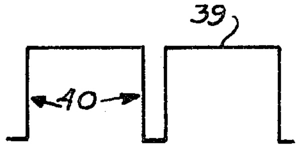
FIG. 6 is a schematic view of the operational characteristics of synchronous wave energy which may be utilized in the embodiments of FIGS. 5, 7 and 8, and to synchronize or drive the motor of FIGS. 9 and 11.
Figure 7:
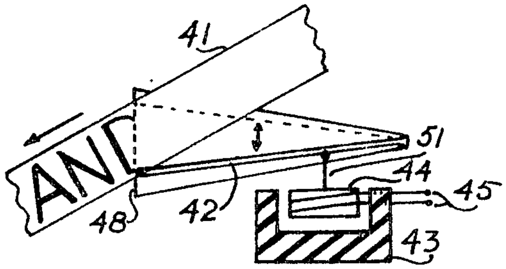
FIG. 7 is a plan view of one form of the invention adapted for use in tape recording to provide a news tape, stock ticker tape and message pasteup tape, or a substitute for a microfilm file, according to the present invention.

FIG. 5 is substantially the same basically, as FIG. 7 of my pending U.S. Pat. application Ser. No. 36,678, filed June 16, 1960, refiled and now Serial No. 418,374, now U.S. Pat. No. 3,419,688 but further improved, particularly for use in the present invention. The present invention also pertains to my pending U.S. Pat. application 20,067 filed Apr. 5, 1960 refiled and now Serial No. 345,553 now abandoned, wherein a magnetic coating material is removed by electricity from a light reflective tape or carrier surface, or where holes are made through the coating and through the tape for either magnetic recording, or recording to be readout by a light sensitive translator. In the drawing, 28 represents one pole section of a recording magnet which is selectively connected through to one side of a multiplicity of recording gaps 29, via the rotating magnetic distributor means 31. This distributing means 31, is fastened to shaft 32 which is synchronously driven at a determined speed relative to a scanning speed. Each spoke of the distributor, or arms, are preferably offset to provide half tone pattern recording effects, that is, each arm displaces the elemental signal energy in alternate transverse lines across the tape 33, which is shown between multi-gap elements 29, and the other side of the gap 30, which is hinged for slight up and down movement at 30*a*. This movement is by hand when inserting tape 33 into the gap. A magnetic means for closing the gap elements 29 and 30 on the tape 33 is shown by permanent magnet 34, which cooperates with moving dynamic coil means 35, which is fastened to pole section 30 by attachment pin 36. The energy to be transversely recorded is fed into coil winding 37 which impresses magnetism preferably always in the same direction, to both sides of the tape 33 via one side of 30 and via the instantly selected element of the multiplicity of gap sections 29, the magnetic action being applied in a directional force to instantly remove an area of the magnetic coating on or from within the tape. To provide fast operating pressures on the tape, when required, a synchronizing signal is provided as illustrated by FIG. 6 which is fed to moving dynamic coil 35 via connecting leads 38. This signal is representative of television camera or facsimile pickup scansion energy, and particularly television framing signals, wherein one section of the signal extending for a length of time as indicated by distance indication 40, is applied through coil 35 via leads 38, to instantly close the gap on the tape during the time that it requires at least one distributor arm to traverse multiple gap means 29 as in relatively slow facsimile recording. The tape movement is preferably stopped or substantially stopped, during each of these synchronizing pulses 40. The next following portion of the synchronizing pressure signal 39 performs also in synchronism with the rotation of shaft 32 to bring the next distributor arm 31 in scansion relation with multiple gaps 29 to provide the next transverse line of recording across the tape 33. Multiple gap elements 29 comprise a great multiplicity of thin magnetic elements insulated from each other and each element connects magnetic energy from the circle area of magnet 28 via the distributor arms 31 to make magnetic contact with the tape to lift the magnetic particles from the tape according to the instantly applied magnetic force. The magnetic elements removed from the tape are carried away by the moving tape, and where necessary, by a jet of air (not shown) positioned to impinge across the tape to remove the displaced particles of the magnetic coating. Multiple gap sections 29 are equidistantly displaced around the circle travelled by the arms of the distributor means 31. The number of gap sections 29 may vary with use. Transverse lines recorded across the tape 33, are continuous in nature when one arm of the distributor 31 leaves the last section 29 on one side of the tape, and the next arm of the distributor instantly or simultaneously begins to traverse the gap section 29 to begin the next transverse line of recording across the tape. In accordance with the description of the invention in my pending U.S. Pat. application Ser. No. 36,678 filed June 16, 1960, the tape may be made to fit into the curvature travelled by the ends of distributor arms 31. Recording energy is applied via slip ring means (not shown) directly by the arms of the distributor 31 traversing the tape in brushing fashion, however, the method as here illustrated where the tape is flat and not physically brushed transversely by the distributor appears to be a preferred method or means to accomplish magnetic removal recording. With the intelligence bearing energy in coil 37 somewhat reduced, magnetic recording is accomplished, and during each transverse line, pressure is applied to the tape which increases the overall efficiency of the recording function.

Figure 8:
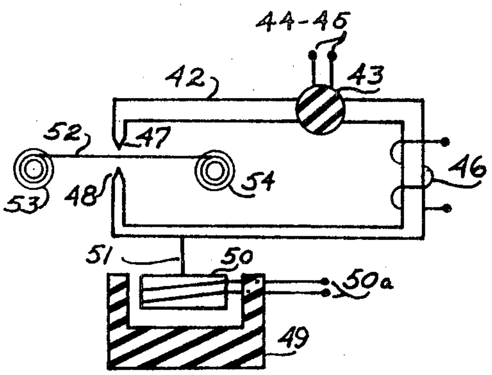
FIG. 8 is an end view of FIG. 7, showing additional parts.

FIGS. 7 and 8 illustrate the present invention adapted as a tape facsimile recorder-printer, such as used for telegraph messages, stock ticker tapes and the like. The tape is represented at 41 and 52. The scanning or moving magnetic stylus is indicated at 42, which is flexible, and forms one section of the horseshoe magnet as further illustrated in FIG. 8. The electrodynamic scanning means is shown by permanent magnet 43 and dynamic moving coil 44 which is attached directly to flexible stylus 42. Stylus 42 is preferably a thin rigid magnetic means, and preferably bendable near it's base, and preferably mechanically resonant exactly to the scanning electric wave energy applied to dynamic coil means 44 at terminals 45. Items or parts of this embodiment of the invention not shown in FIG. 7, are shown in FIG. 8, namely coil winding 46, which supplies the electric wave bearing intelligence to be recorded to horseshoe-like magnet 42 which extends above and below the tape 52, and which applies the resulting magnetic energy to the tape 52 to magnetically remove or record on the tape which passes the points of the horseshoe magnet while 42 is in scansion movement to and fro, said points indicated at 47 and 48 forming the recording gap. The point or pole of the magnet represented by 48, indicates a turned up edge at its end which is brought to a sharp edge that extends across under the tape as shown at 48, which is in magnetic cooperation with stylus point 47 all the way across the tape 52. Attached to the pole unit 48 is an electrodynamic coil unit comprises of permanent magnet 49 and moving dynamic coil 50 which is attached to the magnet by pin attachment 51. Synchronous current of FIG. 6, for example, is applied to move the elongated edge contact 48 upward against the tape 52 to press the tape against the scanning stylus 47, to insure operative magnetic contact between 47 and 48 through the tape during each applied impulse of current 39–40 of FIG. 6. Tape coils 53 and 54 are representative of synchronously driven and magnetic controlled tape winding and tape reeling equipment as described and illustrated in my pending patent application Ser. No. 820,990 filed June 17, 1959 now U.S. Pat. No. 3,160,704 and continuation in part Ser. No. 396,842 now abandoned, or of other types of synchronous drive, braking and tension control means for the movement of the tape in a constant speed manner. In operation, assume the tape 52 is moving through gap at 47 and 48, and energy to be recorded is applied to coil 46, and synchronous scansion energy is applied to coils 45 and 50. Stylus point 47 scans back and forth across the tape in synchronism with the scansion action when the signals to be transmitted are scanned by suitable electronic scanning means, such as an iconscope (not shown) for example. If relatively small currents are applied to coil 46, then the signals are recorded upon the tape in usual magnetic recording fashion. If relatively higher current is applied to coil 46, then the recording magnetic energy removes the area of the magnetic material from the tape instantly between the stylus point 47 and gap edge 48, thus providing a magnetic recording by removal of the magnetic material and a recording capable of being reproduced by a light pickup translator means, or be directly viewed or light projected. When both readout means are simultaneously used, the voltage produced by the magnetic recording and the voltage produced by the light recording may be added, subtracted, and utilized in various ways. Although not shown, the elongated edge 48 may be slightly curved whereby stylus point 47 may scan the tape transversely in uniform relation to the sharp edge 48 all the way across the tape. It is to be understood, that stylus 42 of FIG. 7, and 47 of FIG. 8 may be scanned back and forth across the tape by a rotating cam means in synchronous relation with the transmission and/or the motor driving means.

Figure 10:
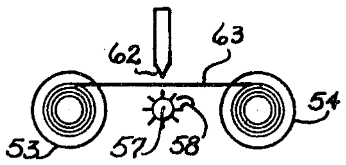
FIG. 10 is an end view of FIG. 9.
Figure 9:
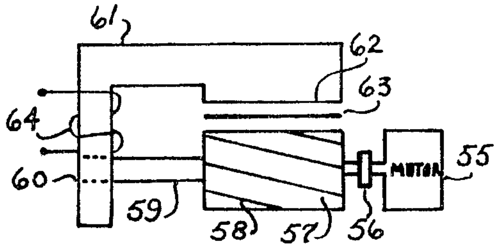
FIG. 9 is a front view of an alternative mode of the invention.

Another mode of the invention, is illustrated as another example of how the invention may be applied and practiced, is shown in FIGS. 9 and 10. A constant speed drive motor means is shown at 55. A non-magnetic drive shaft coupling 56 isolates from motor 55 from the round magnetic rotating pole piece 57 on which a multiplicity of pointed or sharp spiral protrusions 58 are raised above the surface. A shaft extension 59 fits into a bearing 60, which in turn is fitted into a magnetic member 61, which is extended to form a sharp blade edge 62, which makes contact with the top of the tape 63. FIG. 10 is an end view showing the cooperation between the spirals 58 which form one side of the recording gap which preferably makes direct contact with the tape 63, which makes magnetic contact with the other edge of the gap edge 62. In this embodiment of the invention, it is preferred that the tape gap exert pressure upon the tape. Although not shown, adjustable pressure means may be provided to adjust the gap distance against the tape sides. In operation, the tape 63 is pulled between gap edge 62, and rotating spiraled drum 58. The tape movement may result from the actual rotation of pole piece 57 with it's spirals 58 moving against the tape. The motor drives the reeling means, in a manner illustrated by FIG. 10. The energy to be recorded is supplied to coil 64 which supplies magnetic energy to gap edge 62 and spiral edges 58 as a result of intelligence bearing energy supplied to coil 64. The spirals 59 provide the distribution of the magnetic energy in lines transverse of the tape, which records in usual manner, or which removes the magnetic elemental material from the tape according to the length of each impulse and of the strength of the applied electric energy at any instant of time. It is to be appreciated and understood that, as one spiral is leaving the tape on one side of the tape, the next spiral is beginning to traverse and record on the tape at the opposite side of the tape. The bearing 60 receives shaft 59 with but little clearance to provide good magnetic contact as the motor means rotates the spiral pole pieces 57. Spiral scanning as such is not in itself new, but here it is shown and applied for transverse of the tape recording, wherein the drum and the spirals serve as one side of a sharp edged magnetic recording gap, and as a means for distributing the intelligence in lines across the tape. While it is primarily intended that FIGS. 9 and 10 be utilized as a communication type of printer-ticker machine for direct viewing or for projection, it is to be understood, that the motor may be synchronized and controlled in synchronization with television scansion wave energies, and that video frequency energy may be applied to coil 64 with the required power and frequency to effect video recording on the tape by magnetic removal according to the video or wave energy pulsations. The spiral scanning action is extremely accurate and uniform, and the lines can be placed rather close together across the tape. Although a multiplicity of spiraled edges 58 is shown in FIGS. 9 and 10, it is desirable, when seeking higher packing densities, to make the drum as large as practical, and utilize only one spiral which slightly overlaps in it's contact relation with the tape at the completion of each rotation. This causes the edge of the spiral to make contact with the tape at an angle nearer to a right angle to reduce the instant magnetic contact area at any point during each rotation.

Figure 11:
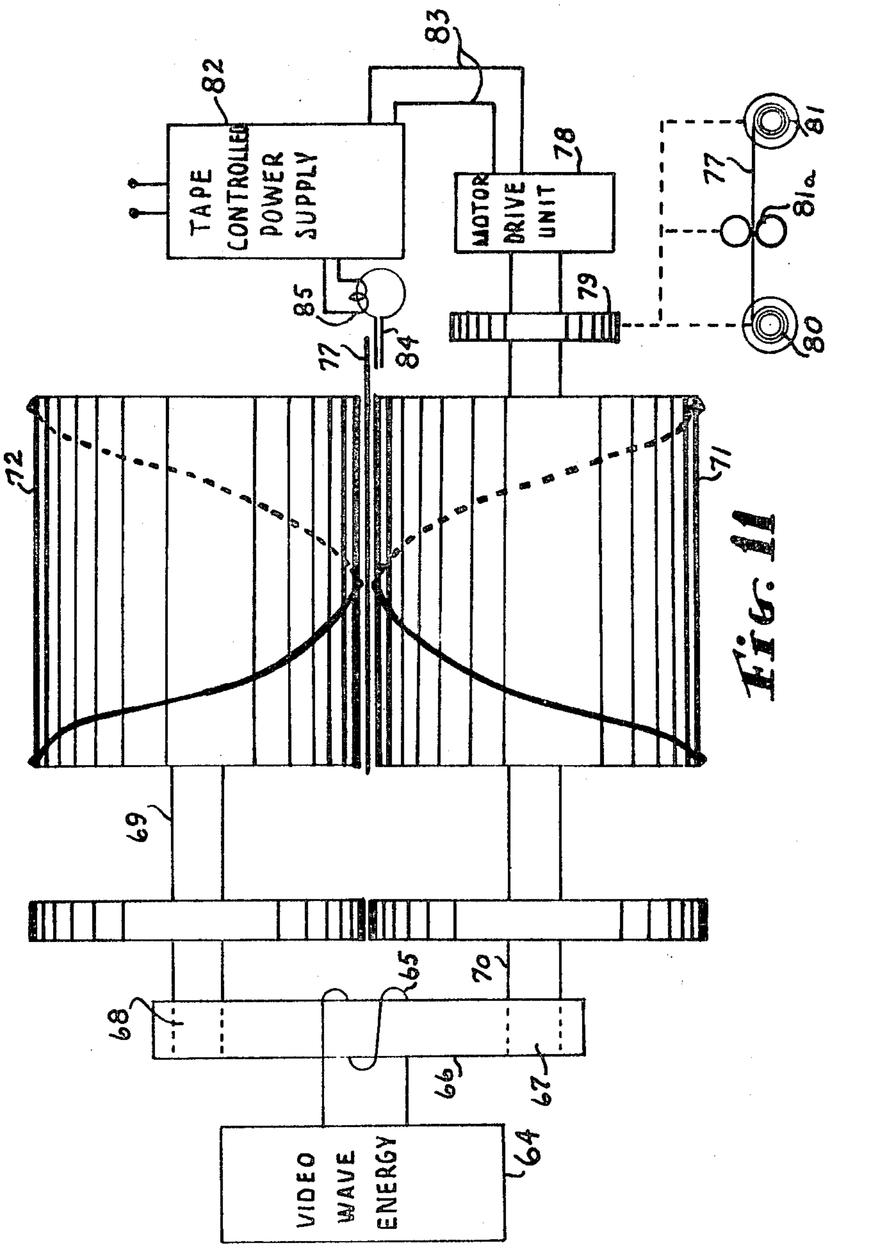
FIG. 11 is another embodiment of the invention.

FIG. 11 shows a double spiraled rotating drum means, forming a scanning magnetic gap means for transverse of the tape magnetic removable recording, to provide very high packing density on the tape. This gap means is substantially a universal readout means also, for all types of transverse of the tape recording. A video supply 64 feeds coil 65 to produce electromagnetic pulsations into horseshoe magnetic circuit 66, containing magnetic bearings 67 and 68 into which magnetic material shafts 69 and 70 are placed, and to which is attached at the other ends of the shafts, spiraled recording drums 71 and 72. All sections of the horshoe magnet may be plated or treated for best efficiency in conducting high frequency magnetism. Recording spirals 73 and 74 are driven by non-magnetic gears 75 and 76 mounted on magnetic shafts 69 and 70. This gear means is representative of a drive means that could take many different forms. Both drums may be driven by separate synchronized electronically controlled drive means. Spirals 73 and 74 are sharp edged, and these perfectly positioned sharp edged spirals draw a straight line transverse of the tape, which approaches a finite line of magnetic projection across the tape. When the tape is an electric sensitive tape, the spirals make contact through a divisional adjustment means in unit 66 (not shown) with the tape to electrically print fine lines transverse of the tape. When it is desired, in thermal etching recording, an electric arc is established between the spiral edges, to etch the surface of a tape or burn holes therethrough. For these purposes, shafts 69 and 70 would be insulated, and the recording energy supplied to the drum spirals by electric slipring means, (not shown). Motor drive unit 78 drives drum 71 via non-magnetic coupling 79 which may also comprise a flywheel means, and is representative of a takeoff for a tape transport drive means to drive tape 77 on reels 80 and 81 via capstan means 81*a*. The motor drive unit is controlled as to constant speed from power supplied from a controlled power supply 82 via connections 83. This power supply is controlled from magnetic undulations printed on the tape, via transducer head gap 84 and coupling coil means 85 in accordance with my pending patent application Ser. No. 820,990, filed June 17, 1959. In operation, video or other wave energy to be recorded is impressed upon the spirals which comprise a travelling or scanning gap, that records one line across the tape. The spirals are so arranged that as one line of recording finishes on the right side of the tape, for example, recording of the next line to follow has already began on the left, or opposite side of the tape. Circuit control means are known to take care of the six decibel gain in signal value during this crossover or bridging action, during readout. This overlap is usually very short in duration. As much power as required is supplied into coil 65, and rectified or non-rectified as desired. Where required, magnetic bridging bands simulating magnetic slip rings not shown, may jump or bypass bearings 67 and 68, including bearing 60 of FIG. 9. If the tape tends to change speed, the pickup head 84 senses this change and corrects the power supply, which in turn, through the motor, corrects the attempt to change the tape speed. This is known as phase correction and deals with minute portions of a driving cycle of the drive power and consequently is very accurate in speed constant ability. Magnetic removal recording according to the present invention, is effected by adjusting the spirals 73 and 74 by a divided adjustment means in member 66, not shown, to make light contact with the tape; rectifying the video power, and increasing the power input to coil 65 to the desired amount. This embodiment of the invention is used to readout by travelling the tape through the gap between the rotating spirals as if recording. It is to be understood that spirals 73 and 74 may have their edges scalloped, providing extremely fine points, and these fine points are positioned exactly opposite of each other on spirals 73 and 74 so that the magnetic energy concentrates through the path between the two matching points opposite of the tape, substantially one pair at a time. This embodiment of the invention may be adapted for use in computers, duplicating work, facsimile, recording, and printing plate preparation wherein. A prepared etched flexible tape is cemented to the printing roller.

It was found that, opposite magnetic poles, when applied above and below the tape, Recording, and Magnetic Removal Recording took place. This recording was most effective when using an extremely sharp blade, or a very sharp pointed recording magnetic pole, which touched or made magnetic contact with the tape.

The concentration of the magnetic lines of force, even though the poles were placed opposite each other of the tape, are in fact in magnetic opposition, did produce strong magnetizations in the tape.

The wave energy modulations utilized with the present invention may be any known method of modulation. Synthetic harmonic generation may be used in combination with the present invention in the recording and reproduction described in my earlier patents. All of the known telecommunication techniques such as limiting within circuits, filtering, rectification, uni-directional current flow circuitry, discriminators and phasing circuitry, are all contemplated where necessary, in carrying the invention into practice, including uni-directional frequency modulation according to my earlier patents. A part of the invention is to automatically volume control the strength of the synchronizing signals for facsimile and video recording, and television scanning camera energies and television synchronizing when applied to cathoderay tubes for reproducing television signals, to provide constant weight and length of synchronizing signals, when these signals of different weight and length are substituted, for example, the synchronizing output signals of different cameras or of tape recordings, and this level control means (not shown) is applicable to the circuitry of the present invention, and of television transmission terminal equipment and means whereever used.

All forms of thermonic and solid state electronic translating and amplification means is also contemplated in carrying the present invention into practice when and where needed.

FIG. 8, the synchronizing signals 39–40 of FIG. 6 may be applied to coils 45 and 50*a*, and the intelligence pulsations may be transmitted superimposed or modulated on the signals 39–40, and preferably filter separated in the receiver, thus simplifying the transmission for tape facsimile transmission.

It is to be understood that any known means of magnetic translation that serves the purpose of direct magnetic removal recording, and light sensitive translation may be used in the invention, and when referred to as means, it is intended to be all encompassing in relating to translating apparatus for recording, and readout of intelligence recorded in accordance with the present invention.

While I have described several methods for satisfactorily removing magnetic material from a tape or sheet of magnetically coated material, there are obviously other possible ways of removing the magnetic material magnetically, however such ways and means are considered to be encompassed in the present invention as set forth in the following claims.

The sharp edged spirals of FIGS. 9 and 11 are distinguished from round wire spirals of the prior art, the sharp edged spirals providing a higher recording packing density in the tape.

What we claim is:

1. A magnetic recording system comprising a recording transducer means for concentrating magnetic energy into a severely concentrated beam of magnetic energy, a supply of energy to be recorded connected to said transducer, a recording tape and medium comprising magnetic particles, said particles being removable from said tape according to pulsations of said supply of energy to be recorded, a tape transport means for moving said tape in operative relationship to the concentrated magnetic energy of said transducer to provide permanent magnetic recording by the absence of the magnetic particles removed from said tape and wherein the transducer comprises a magnetic loop forming a magnetic gap through which a magnetic coated tape passes, a synchronous distributor means for rotation within a circular portion of said magnetic loop, magnetic connecting means between said distributor means and a magnetic gap through which said tape passes to provide transverse of the tape magnetic removal recording, one side of said gap being free to move and is modulated against said tape by an electrodynamic pressure means.

* * * * *